United States Patent [19]

Foot et al.

[11] Patent Number: 6,074,471
[45] Date of Patent: Jun. 13, 2000

[54] SOL-GEL ROUTE TO TRANSPARENT METAL OXIDE FILMS

[75] Inventors: Peter J S Foot; Richard Singer; Maria Sugrue, all of Kingston Upon Thames; Ian J Youngs, Farnborough, all of United Kingdom

[73] Assignee: The Secretary of State for Defence in Her Britannic Majesty's Government of the United Kingdom of Great Britain and Northern Ireland, Farnborough, United Kingdom

[21] Appl. No.: 09/106,114

[22] Filed: Jun. 29, 1998

[30] Foreign Application Priority Data

Jun. 28, 1997 [GB] United Kingdom .................. 9713641

[51] Int. Cl.$^7$ ...................................................... C09K 3/00
[52] U.S. Cl. ...................................................... 106/287.18
[58] Field of Search ........................ 126/287.17, 287.18, 126/287.19

[56] References Cited

U.S. PATENT DOCUMENTS

| | | | |
|---|---|---|---|
| 4,268,539 | 5/1981 | Nakayama et al. | 427/108 |
| 5,811,153 | 9/1998 | Hashimoto et al. | 427/58 |
| 5,820,664 | 10/1998 | Gardiner et al. | 106/287.17 |

*Primary Examiner*—David Brunsman
*Attorney, Agent, or Firm*—Nixon & Vanderhye P.C.

[57] ABSTRACT

This invention relates to metal oxides based films and a method for their production via a sol-gel route using metal bis($\beta$-diketonate) salts as precursors. They can be conveniently doped by Group (III), (IV) or (V) impurities and may be used to provide coductive coating on optically transparent substrates such as glass, ceramics or polymers.

14 Claims, No Drawings

SOL-GEL ROUTE TO TRANSPARENT METAL OXIDE FILMS

This invention relates to metal oxide based transparent films and a method for their production via a sol-gel route.

Tin dioxide ($SnO_2$) and indium (III) tin (IV) oxide (ITO) have long been recognised for their transparency and conductive properties. Thin films of these oxides are suitable for use as transparent electrodes in many applications such as liquid crystal devices (LCDs) and electrochromic displays (ECDs). The sol-gel process involves the conversion of sols (dispersions of colloidal particles in liquids) into gels (semi-solids) which can be further processed to provide transparent laminae with good homogeneity. The gels can be applied directly to some substrates e.g., glass as a transparent coating. The physical properties of the gels allow the user to coat a variety of large and complex shapes. The relatively simple processes involved in sol-gel techniques and the low cost associated with them makes the sol-gel route a desirable one.

Conventional sol-gel methods for the production of transparent metal oxide films use the appropriate metal alkoxides as precursors. These alkoxides undergo ready hydrolysis in the production of metal oxides. Metal alkoxide routes have proved successful on a laboratory scale but are not considered desirable for large scale production due primarily to their inherent toxicity. A further significant disadvantage of metal alkoxides is their non-polar character. This non-polarity renders them insoluble in many of the solvents suitable for use in the conventional coating of transparent polymers with metal oxide films and a consequent difficulty in avoiding damage to the polymer surfaces, in bonding the films to the polymers.

Aqueous $SnCl_4$ has been considered by experts in the field of thin film technology as a precursor for tin oxide films prepared by the sol-gel process (Hiratsuka, Santilli, Silva, Pulcinelli, J. Non-Cryst. Solids 147 (1992) 67, Lada, W., Deptula, A., Olczak, T., Torbicz, W., Pijanoluska, D., Di Bartolomeo, A., J. Sol-Gel Sci. and Tech. 2 (1994) 551, Souza Brito, G. E., Pulcinelli, S. H., Santilli, C. V., J. Sol-Gel Sci. and Tech. 2 (1994) 575). Metallic isopropoxides such as those of tin ($Sn(OC_3H_7)_4$) and indium ($In(OC_3H_7)_3$) have also been used in the preparation of $SnO_2$ and $In_2O_3$ films, with anhydrous ethanol as solvent (Park, S., MacKenzie, J. D., Thin Solid Films 258 (1995) 268, Mattox, D., Thin Solid Films 204 (1991) 25).

Some work has combined the hydrated salt $SnCl_2.2H_2O$ with anhydrous ethanol as solvent to produce gelation (Maddelena et al. J. Non-Cryst. Solids 121 (1990) 365). Other routes have used butylate derivatives of organometallic compounds of tin and antimony to produce antimony doped tin oxide gels (Puyane et al, Proc. Soc. Photo-Optical Instrumentation Engineering 401 (1983) 190).

In a first aspect the present invention is a method for the production of a transparent doped or undoped metal oxide colloid comprising; dissolving a metal bis(β-diketonate) salt in a polar organic solvent, the metal salt being selected from the halides and alkanoates of Group (III) or Group (IV) metals, adding a suitable dopant over the cation substitution range 0 to 20 atomic % and sufficient water to hydrolyse the precursor, and then leaving for at least 20 minutes at ambient temperature (typically 20 to 30° C.) to initiate the sol-gel formation. This colloid can be used for the manufacture of transparent metal oxide films.

Preferred Group (III) and (IV) metal oxide precursors are indium (III) and tin (IV) salts as these provide well known and commonly used transparent conductive oxide products.

The skilled addressee will understand that appropriate β-diketonate ligands may contain alkyl-, alkoxy- and/or polyether groups having up to 10 carbon atoms in their chain. (Such ligands may for example be the acetylacetonate anion, or the anions of 3,6-heptanedione or of ethyl acetoacetate.)

A preferred β-diketonate ligand is acetylacetonate. Preferably the metal salts are halides, most preferably chlorides or bromides, due to their abundance and relative safeness of handling.

Conveniently the dopant will comprise Group (III), Group (IV) or Group (V) metallic ions, most preferred dopants are halides or indium, tin or antimony. It will be apparent to the skilled addressee that for a Group (IV) metal oxide precursor, a Group (III) or Group (V) based dopant will be preferable and for a Group (III) metal oxide precursor, a Group (IV) based dopant will be preferable.

A convenient organic solvent is acetone, other suitable organic solvents will be familiar to the skilled addressee.

The invention will now be further described by way of exemplification, the following example relates to a tin oxide gel end product. It will be readily apparent to the skilled addressee that substitution of the tin (IV) bis(acetyl acetonate) dichloride with alternative tin (IV) bis(β-diketonate) salt as herein described will produce a similar end product. It will also be apparent to the skilled addressee that substitution of the tin (IV) bis(acetyl acetonate) dichloride with any appropriate indium (III) bis(β-diketonate) salt and suitable dopant as described herein will provide an analogous indium oxide gel end product. (In this latter case, a tin (IV) salt will be a suitable dopant.)

With tin (IV) bis(acetyl acetonate) dichloride as a starting material and a suitable dopant (typically $InBr_3$ or $SbBr_3$), the following steps result in a transparent tin oxide gel. The dopant is added to the tin (IV) bis(acetylacetonate) dichloride in sufficient volume to give between 1 and 20 atom % of impurity metal. Water is added and the container is covered with a moisture proof film and left in a waterbath at 20–30° C. Within a few minutes of adding the water, the clear solution forms an opalescent sol which gradually changes to a cloudy viscous solution (~1 hour). At this point some small areas of transparent gel can be observed. After a few hours more, a white floc forms. If the floc is left undisturbed and covered by the moisture proof film the viscosity and volume of solution decreases over several days (typically 10 to 14 days) to give a solution which is generally colourless or may have a slight yellow hue. This solution is very suitable for spin, spray, brush coating or casting onto the surface of substrate articles.

Alternatively, the floc can be centrifuged to give a viscous white thixotropic gel. This gel can conveniently be used for dip-coating.

A schematic for the above production route to doped tin oxide gels is shown below:

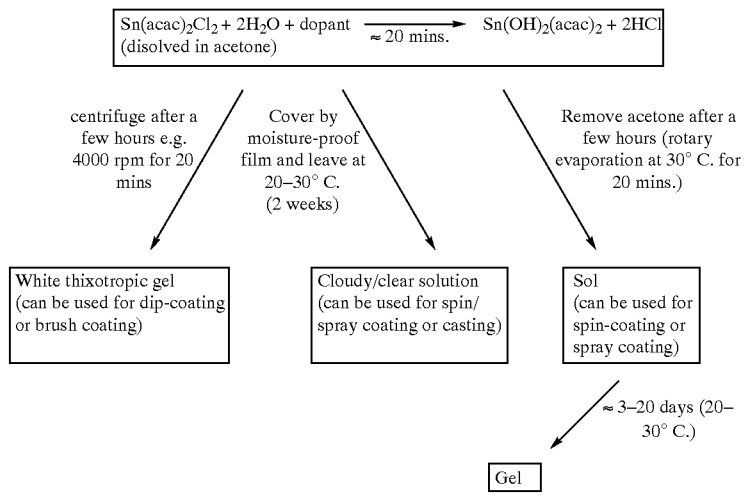

The resulting gels can be used to coat glass and some surface treated polymer substrates e.g. polycarbonate and poly (methyl methacrylate). Good bonding is achieved by chemical interaction of the residual β-diketonate with the surface of the substrate article, avoiding the need for an additional adhesive layer. However, if required, further improvement in the adhesion of the film to the substrate is achieved through the use of coupling agents. These may beneficially be added directly to the sol-gel mixture in certain cases, exemplified below.

In a second aspect the invention is a method of coating an article with a transparent metal oxide film comprising; dissolving a metal bis(β-diketonate) salt in an organic solvent, the metal salt being selected from the halides and alkanoates of Group (III) and Group (IV), preferably tin and indium, adding a suitable dopant over the cation substitution range 0 to 20%, leaving for at least 20 minutes at ambient temperature to initiate sol-gel formation, and coating the article with the resultant sol or gel.

Conventional coating techniques applicable to this aspect of the invention include spin, spray, brush coating, casting and dip-coating. Likely optically transparent substrate articles include glasses, polymers and transparent ceramics. Optionally polymeric substrates may be pre-treated by exposure to UV/ozone to improve adhesion of the coating to the substrate surface.

Optionally, short periods of very near infrared optical radiation may be used to increase the crystallinity and hence the conductivity of the coatings. A wavelength range of preferably 0.8 to 2 μm allows the inorganic transparent oxide film coating to absorb heat energy without excessive heating and subsequent degradation of the substrates.

This aspect of the invention will now be further described by way of exemplification. Variations on this method within the scope of this invention will occur to the skilled addressee.

Sn(acetylacetonate)$_2$Cl$_2$ (2.0 g) was dissolved in acetone (20 ml), to which 1% SbBr$_3$ in acetone (10.70 ml) was added. Water was added (19.30 ml) and the reaction vessel was covered with moisture proof film and left in a waterbath at 25° C. After 2 months, approximately 10 ml of an intense yellow liquid remained. A silica substrate was coated with the liquid using a dip-coating technique, followed by annealing at 110° C. for 1 hour, and then at 400° C. for 10 minutes, 600° C. for 1 hour. The conductivity of the coating was 3.47 Scm$^{-1}$ and the average percentage transmittance over the visible range (400–700 nm) was greater than 70%.

Sn(acetylacetonate)$_2$Cl$_2$ (2.0 g) was dissolved in acetone (27.16 ml). 1% SbBr$_3$ in acetone (12.84 ml) was added to give an approximate doping concentration of 6 atomic % by cation substitution. Water (30 ml) was added and the reaction vessel was covered with moisture proof film and placed in a waterbath at 25° C. After 17 days, approximately 25 ml of a clear liquid remained, this was used to coat a pre-treated polycarbonate substrate by spin-coating, followed by drying under vacuum for greater than 8 hours at 20 to 30° C. The pre-treatment of the polycarbonate consisted of exposing the substrate to UV/ozone for two hours. The surface resistance of the coating was 380 kΩ/□ and its percentage transmittance over the visible range was greater than 90%.

Sn(acetylacetonate)$_2$Cl$_2$ (1.0 g) was dissolved in acetone (20 ml) to which 1% SbBr$_3$ in acetone (4.28 ml) was added to give an approximate doping concentration of 4% by cation substitution. Water was added (15 ml) and the reaction vessel was covered with moisture proof film and left in a waterbath at 25° C. After 6 months, approximately 10 ml of clear yellow liquid remained. A coupling agent solution was prepared by adding methyl trichlorosilane (0.25 ml) to isopropanol (2 ml). The coupling agent solution (0.25 ml) was added to the above tin oxide liquid (2 ml). This was used to coat a pre-treated polycarbonate substrate for by spin-coating, eight coatings were applied in this way followed by drying under vacuum for 1 hour at 50° C. The pretreatment of the polycarbonate consisted of exposing the substrate to UV/ozone for two hours. The coated polymer was exposed to infrared heat treatments. The percentage transmittance of the tin oxide coating over the visible range was greater than 90%. It also displayed improved adhesion.

In a third aspect the present invention is an article coated with a metal oxide film by a method comprising; dissolving a metal bis(β-diketonate) salt in a polar organic solvent, the metal salt being selected from the halides and alkanoates group (III) of group (IV) metals, adding a suitable dopant over the cation substitution range 0 to 20 atomic % and sufficient water to hydrolyse the precursor, and then leaving for at least 20 minutes at 20 to 30° C. to initiate the sol-gel formation. and coating the article with the resultant gel.

What is claimed is:

1. A method for the production of a transparent metal oxide colloid comprising the steps of (a) dissolving a metal bis(β-diketonate) halide in a polar organic solvent, the metal being selected from Group (III) and (IV) metals, and thereafter (b) adding sufficient water to hydrolyze the metal bis(β-ketonate) salt precursor.

2. A method for the production of a transparent metal oxide colloid as claimed in claim 1 wherein the metal bis(β-diketonate) halide is left for at least 20 minutes at ambient temperature to initiate sol-gel formation.

3. A method for the production of a transparent metal oxide colloid as claimed in claim 1 wherein a dopant is added in a cation substitution amount of 1 to 20 atomic % to provide a conductive doped metal oxide coating thereby increasing the conductivity of the coating.

4. A method for the production of a transparent metal oxide colloid as claimed in claim 3 wherein said dopant comprises metal ions from Group (III) or Group (V).

5. A method for the production of a transparent metal oxide colloid as claimed in claim 3 wherein said dopant comprises metal ions from Group (IV).

6. A method for the production of a transparent metal oxide colloid as claimed in claim 4 or 5 wherein said dopant comprises a halide of indium or antimony.

7. A method for the production of a transparent metal oxide colloid as claimed in claim 1 wherein the bis(β-diketonate) halide comprises alkyl, alkoxy- and/or polyether groups having up to 10 carbon atoms in its chain.

8. A method for the production of a transparent metal oxide colloid as claimed in claim 1 wherein the bis(β-diketonate) halide is selected from an acetylacetonate anion and the anions of 3,6-heptanedione and ethyl acetoacetate.

9. A method for the production of a transparent metal oxide colloid as claimed in claim 1 wherein the halide is chloride or bromide.

10. A method for the production of a transparent metal oxide colloid as claimed in claim 1 wherein the metal bis(β-diketonate) halide comprises a Group (IV) metal.

11. A method for the production of a transparent metal oxide colloid as claimed in claim 10 wherein the Group (IV) metal is tin.

12. A method for the production of a transparent metal oxide colloid as claimed in claim 1 wherein the metal bis(β-ketonate) halide comprises a Group (III) metal.

13. A method for the production of a transparent metal oxide colloid as claimed in claim 12 wherein the Group (III) metal is indium.

14. A method for the production of a transparent metal oxide colloid as claimed in claim 1 wherein the polar organic solvent is acetone.

* * * * *